R. M. HERMANCE.
Culinary Vessel.
No. 110,039.             Patented Dec. 13, 1870.
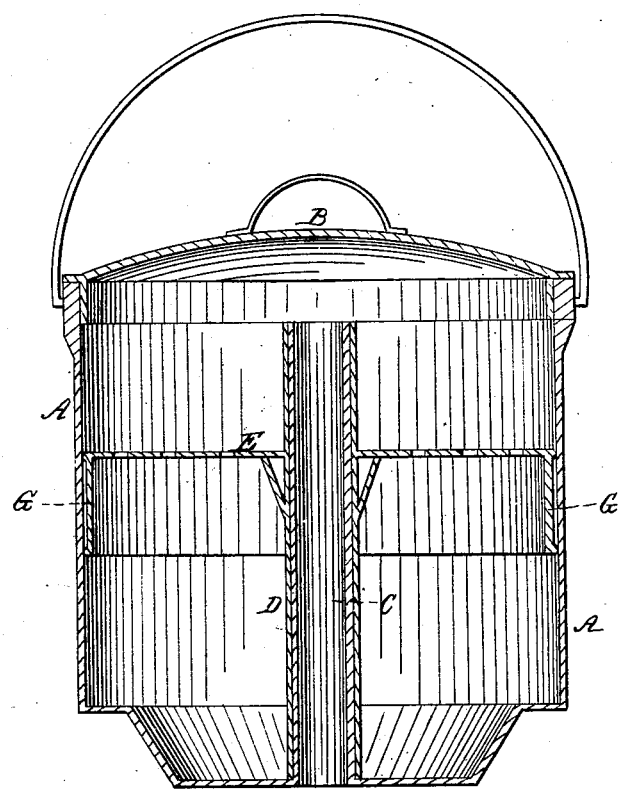

UNITED STATES PATENT OFFICE.

RICHARD M. HERMANCE, OF TROY, NEW YORK.

IMPROVEMENT IN CULINARY VESSELS.

Specification forming part of Letters Patent No. 110,039, dated December 13, 1870; antedated December 1, 1870.

*To all whom it may concern:*

Be it known that I, RICHARD M. HERMANCE, of Troy, in the county of Rensselaer and in the State of New York, have invented certain new and useful Improvements in Culinary Kettle and Steamer; and do hereby declare that the following is a full, clear, and exact description thereof, reference being had to the accompanying drawings, and to the letters of reference marked thereon, making a part of this specification.

The nature of my invention consists in the construction and arrangement of a culinary kettle and steamer, as will be hereinafter more fully set forth.

In order to enable others skilled in the art to which my invention appertains to make and use the same, I will now proceed to describe its construction and operation, referring to the annexed drawings, which represent a longitudinal vertical section of my kettle and steamer.

A represents a kettle, of any suitable dimensions, provided with a lid, B.

From an opening in the center of the bottom of the kettle A, a tube, C, extends upward to near the top, as seen in the drawing. Around this tube is placed a loose tube, D, to which, at a suitable height from the lower end, is secured a perforated plate, E, fitting within the kettle, said plate being around its periphery provided with a downward-extending flange or rim, G.

The articles to be steamed are placed on the perforated plate E, the steam from the water below passing up through the perforations in said plate, and, after steaming the articles, passing down through the tube C, carrying with it all odors from the articles which would otherwise escape into the room.

The bottom or plate E may be placed with the rim G, extending upward, and, if so desired, the plate E may be without holes and the perforations in the rim.

Having thus fully described my invention, what I claim as new, and desire to secure by Letters Patent, is—

1. The tube D, with perforated plate E and rim G, substantially as and for the purposes herein set forth.

2. The combination of the kettle A with its central tube C, loose tube D, plate E, and rim G, all substantially as and for the purposes herein set forth.

In testimony that I claim the foregoing I have hereunto set my hand this 15th day of April, 1870.

RICHARD M. HERMANCE.

Witnesses:
 ALVAH TRAVER,
 GEORGE A. LORD.